United States Patent
Li

(10) Patent No.: US 12,432,775 B2
(45) Date of Patent: Sep. 30, 2025

(54) COMMUNICATION METHOD, APPARATUS, AND DEVICE, AND READABLE STORAGE MEDIUM

(71) Applicant: Beijing Xiaomi Mobile Software Co., Ltd., Beijing (CN)

(72) Inventor: Yuanyuan Li, Beijing (CN)

(73) Assignee: Beijing Xiaomi Mobile Software Co., Ltd., Beijing (CN)

(*) Notice: Subject to any disclaimer, the term of this patent is extended or adjusted under 35 U.S.C. 154(b) by 379 days.

(21) Appl. No.: 17/912,191

(22) PCT Filed: Mar. 17, 2020

(86) PCT No.: PCT/CN2020/079789
§ 371 (c)(1),
(2) Date: Sep. 16, 2022

(87) PCT Pub. No.: WO2021/184223
PCT Pub. Date: Sep. 23, 2021

(65) Prior Publication Data
US 2023/0138473 A1    May 4, 2023

(51) Int. Cl.
*H04W 74/0808*    (2024.01)
(52) U.S. Cl.
CPC ................ *H04W 74/0808* (2013.01)
(58) Field of Classification Search
CPC .............. H04W 74/0808; H04L 12/50
USPC .................................. 370/329, 401, 403
See application file for complete search history.

(56) References Cited

U.S. PATENT DOCUMENTS

| 2016/0157218 A1* | 6/2016 | Nam | H04B 7/0632 370/329 |
| 2022/0263602 A1* | 8/2022 | Horn | H04B 7/0408 |

FOREIGN PATENT DOCUMENTS

| CN | 107395329 A | 11/2017 |
| CN | 107852752 A | 3/2018 |
| CN | 109565834 A | 4/2019 |
| CN | 110351881 A | 10/2019 |
| CN | 110651524 B | 1/2020 |
| CN | 110830194 A | 2/2020 |
| CN | 110831231 A | 2/2020 |
| WO | 2016072908 A1 | 5/2016 |
| WO | 2017/051236 A1 | 3/2017 |
| WO | 2019216619 A1 | 11/2019 |

OTHER PUBLICATIONS

Huawei, et al. "3GPP TSG RAN WG1 Meeting #99 R1-1911868" HARQ enhancement in NR unlicensed, Nov. 22, 2019, section 6.
Huawei, et al. "3GPP TSG RAN WG1 Meeting #98 R1-1908111" HARQ enhancement in NR unlicensed, Aug. 30, 2019, section 4.
Huawei, HiSilicon, "NRU wideband BWP operation", 3GPP TSG RAN WG1 Meeting #96bis, R1-1903932, Xi'an, China, Apr. 8-12, 2019.

* cited by examiner

*Primary Examiner* — Dang T Ton
(74) *Attorney, Agent, or Firm* — Volpe Koenig

(57) ABSTRACT

A communication method includes: determining, from at least two listen-before-talk (LBT) frequency bands, a first LBT frequency band on which channel listening is successful; and sending an uplink communication message on a first physical uplink control channel (PUCCH) on the first LBT frequency band.

16 Claims, 4 Drawing Sheets

COMMUNICATION METHOD, APPARATUS, AND DEVICE, AND READABLE STORAGE MEDIUM

CROSS-REFERENCE

The present application is a U.S. National Stage of International Application No. PCT/CN2020/079789, filed on Mar. 17, 2020, the contents of all of which are incorporated herein by reference in their entireties for all purposes.

BACKGROUND

A 3rd generation partnership project (3GPP) defines three major directions of a 5G application scene, i.e., an enhanced mobile broadband (eMBB), a massive machine type of communication (mMTC), and ultra reliable & low latency communication (URLLC).

SUMMARY

The disclosure relates to the field of communication, in particular to a communication method and apparatus, a device, and a readable storage medium.

The technical solution is as follows.

In one aspect, provided is a communication method, performed by a terminal, where the method includes: determining, from at least two listen-before-talk (LBT) frequency bands, a first LBT frequency band on which channel listening is successful; and sending an uplink communication message on a first physical uplink control channel (PUCCH) on the first LBT frequency band.

In another aspect, provided is a communication method, performed by an access network device, where the method includes: listening an uplink communication message sent by a terminal on a first physical uplink control channel (PUCCH) of at least two listen-before-talk (LBT) frequency bands.

In another aspect, provided is a terminal, including: a processor; and a transceiver connected with the processor; where the processor is configured to load and execute executable instructions so as to implement the communication method provided by the examples of the disclosure.

In another aspect, provided is an access network device, including: a processor; and a transceiver connected with the processor; where the processor is configured to load and execute executable instructions so as to implement the communication method provided by the examples of the disclosure.

In another aspect, provided is a non-transitory computer readable storage medium, where at least one instruction, at least one program, a code set or an instruction set is stored in the computer readable storage medium. The at least one instruction, the at least one program, the code set or the instruction set is loaded and executed by a processor to implement the communication method provided by the examples of the disclosure.

BRIEF DESCRIPTION OF THE DRAWINGS

In order to more clearly illustrate the technical solutions in the examples of the present disclosure, the drawings to be used in the description of the examples will be briefly introduced below. The drawings in the following description are some examples of the present disclosure. For those of ordinary skill in the art, other drawings can be obtained based on these drawings without inventive efforts.

DETAILED DESCRIPTION

In order to make the purpose, the technical solution of the disclosure clearer, the implementation modes of the disclosure are further described in detail below in combination with the drawings.

The examples of the disclosure provide a communication method and apparatus, a device, and a readable storage medium. The reliable and low-latency transmission of HARQ-ACK information can be carried out on an unlicensed frequency band.

When a terminal sends hybrid automatic repeat request acknowledge character (HARQ-ACK) information on an unlicensed frequency band, channel listening needs to be carried out on a listen-before-talk (LBT) frequency band to which a physical uplink control channel (PUCCH) belongs, and when channel listening fails, the terminal cannot send the HARQ-ACK information, which does not meet the requirement of low latency of URLLC service.

Figure 1:
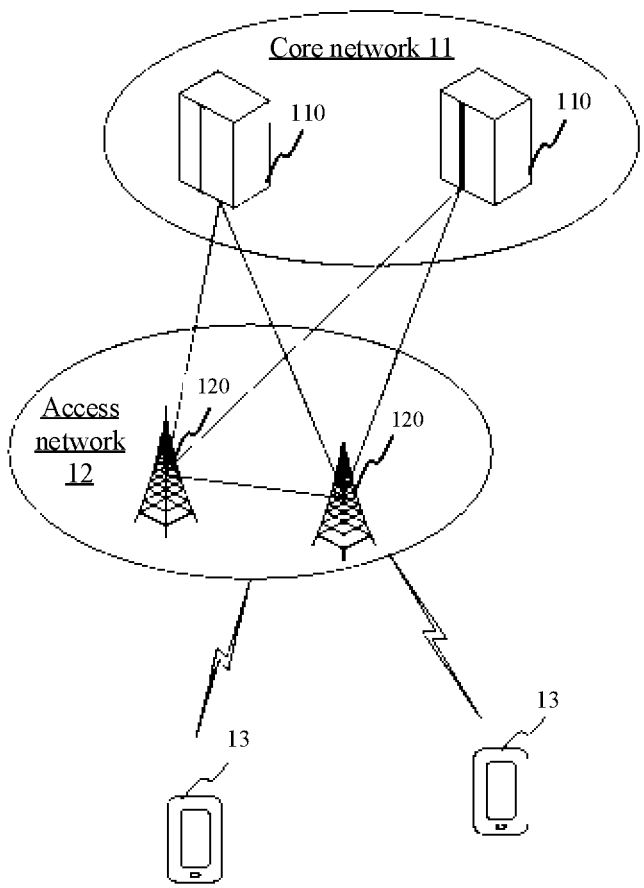
FIG. 1 is a block diagram of a communication system provided by one example of the disclosure.

FIG. 1 shows a block diagram of a communication system provided by one example of the disclosure. The communication system may include: a core network 11, an access network 12, and a terminal 13.

The core network 11 includes a plurality of core network devices 110. The core network device 110 includes an access and mobility management function (AMF) device, a session management function (SMF) device, a user plane function (UPF) device and the like, the AMF is used for controlling the access authority, switching and other functions of a terminal, and the SMF is used for providing the continuity of a server and the uninterrupted user experience of the server, such as an IP address and anchor point change and the like.

The access network 12 includes a plurality of access network devices 120. The access network device 120 may be a base station, and the base station is a device deployed in an access network for providing a wireless communication function for a terminal. The base station may include various forms of macro base stations, micro base stations, relay stations, access points, etc. In a system employing different radio access technologies, the names of devices having base station functions may be different, for example, in a long term evolution (LTE) system, the device is referred to as eNodeB or eNB; in a 5G new radio (NR) system, the device is referred to as gNode B or gNB. Along with evolution of a communication technology, the name "base station" may be described and changes. In order to facilitate the examples of the disclosure, the device for providing the wireless communication function for the terminal is collectively called an access network device.

The terminal 13 may include a variety of handheld devices, in-vehicle devices, wearable devices, computing devices, or other processing devices connected to a wireless modem having a wireless communication function, as well as a variety of forms of terminals (user equipments, UEs), mobile stations (MSs), terminal devices, and the like. In order to facilitate description, the devices mentioned above are collectively called terminals. The access network device 120 and the terminal 13 communicate with each other through a certain air interface technology, such as a Uu interface.

In some examples, in a process of wireless communication between the terminal 13 and the access network device 120, wireless communication can be carried out through a licensed frequency band, and wireless communication can also be carried out through an unlicensed frequency band. In some examples, in the examples of the disclosure, wireless communication between the terminal 13 and the access network device 120 through the unlicensed frequency band is described as an example.

In the NR system, uplink control information (UCI) is control information which is carried on a physical uplink control channel (PUCCH) or a physical uplink shared channel (PUSCH), and sent by UE to a base station. The UCI includes hybrid automatic repeat request acknowledge character (HARQ-ACK) information of downlink data, the HARQ-ACK information is used for feeding back whether the received downlink data is correctly received or not to the base station, and includes an acknowledge character (ACK) and a negative-acknowledge character (NACK), the acknowledge character is used for representing downlink data correctly received by the UE, and the NACK is used for representing downlink data not received by the UE.

In the discussion and design of a NR-unlicensed spectrum (NR-U) of the R16 standard, a sending end generally needs to be subjected to channel listening before sending a communication message, and the communication message can be sent in the channel after the channel listening is successful, namely, the listened channel is determined not to be occupied by other sending ends, namely, a channel occupation mechanism of listen before talk (LBT) is adopted.

The sending end performs channel listening by taking one LBT frequency band (bandwidth) as a frequency unit, one LBT frequency band is 20 MHz, and an uplink resource, namely, an uplink bandwidth part (BWP), configured for UE by a base station can include one or more LBT frequency bands. On an unlicensed frequency band, when a base station configures a PUCCH resource for UE, an LBT frequency band position where the PUCCH resource is located needs to be configured, for example, an index value of the LBT frequency band where the PUCCH resource is located is configured, and the PUCCH resource is limited in a LBT frequency band range.

PUCCH resources on a NR-U system may be configured to be interlaced or non-interlaced. The non-interlaced PUCCH resource is a PUCCH resource configuration mode defined in the original R15 standard, that is, if the PUCCH resource occupies a plurality of continuous frequency domain resource blocks (RBs) on a frequency domain, the plurality of RBs are continuous on the frequency domain. An interlaced PUCCH resource allocation mode is to divide a 20 MHz LBT frequency band into 10 (15 KHz subcarrier) or 5 (30 KHz subcarrier) interlacings. For example, in the 15 KHz subcarrier, the 20 MHz LBT frequency band includes 106 RBs, an index is 0-105, the LBT frequency band is divided into 10 interlacings, an index is 0-9, and each interlacing includes 10 or 11 RBs. For example, interlacing 0 includes RB 0, 10, 20, 30, 40, 50, 60, 70, 80, 90 and 100 (11 in total), and interlacing 6 includes RB 6, 16, 26, 36, 46, 56, 66, 76, 86 and 96 (10 in total).

3GPP defines three major directions of a 5G application scene, i.e., an enhanced mobile broadband (eMBB), a massive machine type of communication (mMTC), and ultra reliable & low latency communication (URLLC), and the URLLC requires high reliability and low latency, while the eMBB requires a relatively high data transmission rate.

For a physical downlink shared channel (PDSCH) scheduled by a base station, UE needs to feed back HARQ-ACK, and the HARQ-ACK information is transmitted by using a PUCCH channel resource.

For URLLC service, the HARQ-ACK information needs to be transmitted timely and accurately, and a situation that the HARQ-ACK information of the PUCCH channel is unsuccessfully sent due to unsuccessful UE channel listening is reduced. For PUCCH channel used for transmitting HARQ-ACK information of URLLC PDSCH, if UE fails to carry out channel listening on a LBT frequency band to which the PUCCH channel belongs, the UE cannot send the information of the PUCCH channel, namely, a base station cannot timely obtain HARQ-ACK feedback.

In the NR-U standard, a mechanism for repeatedly transmitting HARQ-ACK information exists, for a HARQ-ACK codebook formed by the HARQ-ACK information corresponding to one or more PDSCHs, when the HARQ-ACK codebook fails to be transmitted, the HARQ-ACK codebook can be repeatedly transmitted in a HARQ-ACK feedback opportunity in later time, but the repeated transmission mechanism needs to wait for a certain duration, which does not meet the low latency requirement of the URLLC service.

Figure 2:
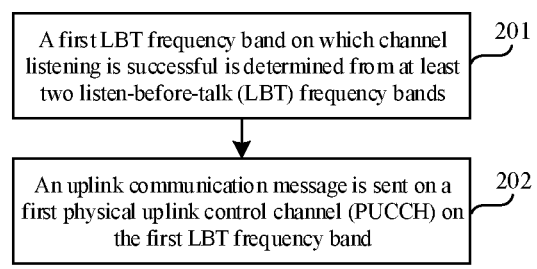
FIG. 2 is a flow chart of a communication method provided by one example of the disclosure.

FIG. 2 is a flow chart of a communication method provided by one example of the disclosure, the method is applied to the terminal as shown in FIG. 1 as an example, and as shown in FIG. 2, the method includes steps 201 and 202.

In step 201, a first LBT frequency band on which channel listening is successful is determined from at least two listen-before-talk (LBT) frequency bands.

In some examples, the at least two LBT frequency bands include any one of:

firstly, a terminal is configured with a first physical uplink control channel (PUCCH) for sending an uplink communication message, the first physical uplink control channel (PUCCH) is configured with at least two corresponding LBT frequency bands, and channel listening is performed on the at least two LBT frequency bands;

in some examples, for the at least two LBT frequency bands corresponding to the first physical uplink control channel (PUCCH), channel parameters of the first physical uplink control channel (PUCCH) are the same, and the channel parameters include at least one of relative time-frequency resource positions, channel formats, maximum code rates and cyclic shift codes in different LBT frequency bands, that is, for the at least two LBT frequency bands, the relative time-frequency resource positions, the channel formats, the maximum code rates, and the cyclic shift codes of the first PUCCH are the same.

In some examples, the first LBT frequency band on which channel listening is successful is determined from the at least two LBT frequency bands corresponding to the first physical uplink control channel (PUCCH) in response to the fact that the relative time-frequency resource positions of the first PUCCH are the same.

In some examples, the first PUCCH channel may include different parameter configurations for the at least two LBT frequency bands, and illustratively, for the at least two LBT frequency bands, the relative frequency domain resource locations of the first PUCCH are different, such as a frequency domain resource location of the first PUCCH channel on the first LBT frequency band is interleaving 3, and a frequency domain resource location of the first PUCCH channel on a second LBT frequency band is interleaving 5. In some examples, the channel formats, the maximum code rates, or the cyclic shift codes of the first PUCCH channel may also be different.

Secondly, a terminal is configured with a second physical uplink control channel (PUCCH) for sending an uplink communication message, the second physical uplink control channel (PUCCH) is configured to correspond to a second LBT frequency band, and channel listening is performed on at least two LBT frequency bands including the second LBT frequency band.

In response to failure of listening on the second LBT frequency band corresponding to the second physical uplink control channel (PUCCH), the first LBT frequency band on which channel listening is successful is determined from other LBT frequency bands; and in response to successful listening on the second LBT frequency band corresponding to the second physical uplink control channel (PUCCH), the uplink communication message is directly transmitted through the second physical uplink control channel (PUCCH) without determining the first LBT frequency band.

The at least two LBT frequency bands are LBT frequency bands included in BWP configured for a terminal, and each LBT frequency band corresponds to one index.

Then, in step 202, an uplink communication message is sent on a first physical uplink control channel (PUCCH) on the first LBT frequency band.

For the two LBT frequency band determination methods, sending modes of the uplink communication message are respectively described.

Firstly, when a terminal is configured with a first physical uplink control channel (PUCCH) for sending an uplink communication message and the first physical uplink control channel (PUCCH) is configured with at least two corresponding LBT frequency bands, after the first LBT frequency band on which channel listening is successful is determined from the at least two LBT frequency bands, the uplink communication message is sent on the first physical uplink control channel (PUCCH) of the first LBT frequency band, as the first physical uplink control channel (PUCCH) has a same relative time-frequency resource position relative to the at least two LBT frequency bands, namely, a physical resource position on each LBT frequency band is fixed, the uplink communication message is sent on a corresponding physical resource position of the first LBT frequency band after the first LBT frequency band is determined.

Illustratively, a physical uplink control channel (PUCCH) resource is configured for a terminal, and a plurality of LBT frequency bands are configured for the physical uplink control channel (PUCCH) resource, such as three LBT frequency bands are configured, namely a LBT frequency band 1, a LBT frequency band 2 and a LBT frequency band 3, when the terminal uses the physical uplink control channel (PUCCH) to send HARQ-ACK information, channel listening is performed on the three LBT frequency bands, and when there is a LBT frequency band on which channel listening is successful, the HARQ-ACK information is sent on the PUCCH channel on the LBT frequency band on which channel listening is successful.

The uplink communication message may be implemented as HARQ-ACK information, and in some examples, the uplink communication message is high-priority HARQ-ACK information.

In some examples, the uplink communication message can also be implemented as an uplink scheduling request (SR), i.e., for a semi-statically configured PUCCH resource for transmitting the SR, a plurality of LBT frequency bands are configured; or, for a semi-statically configured physical uplink shared channel (PUSCH) resource for transmitting uplink data, a plurality of LBT frequency bands are configured.

The disclosure also discloses a communication apparatus, where the communication apparatus is configured with a first physical uplink control channel (PUCCH) for sending an uplink communication message, and the first physical uplink control channel (PUCCH) is configured with at least two corresponding LBT frequency bands.

In one optional example, the first physical uplink control channel (PUCCH) has a same relative time-frequency resource position relative to at least two LBT frequency bands. Thus, since a physical resource position on each LBT frequency band is fixed, the uplink communication message can be sent on the corresponding physical resource position of the first LBT frequency band after the first LBT frequency band is determined.

The uplink communication message may be implemented as HARQ-ACK information, and in some examples, the uplink communication message is high-priority HARQ-ACK information.

In some examples, the uplink communication message can also be implemented as an uplink scheduling request (SR), i.e., for a semi-statically configured PUCCH resource for transmitting the SR, a plurality of LBT frequency bands are configured; or, for a semi-statically configured physical uplink shared channel (PUSCH) resource for transmitting uplink data, a plurality of LBT frequency bands are configured.

Secondly, a terminal is configured with a second physical uplink control channel (PUCCH) for sending an uplink communication message, the second physical uplink control channel (PUCCH) is configured with a second LBT frequency band, if channel listening on the second LBT frequency band fails, the first LBT frequency band on which channel listening is successful is determined from other LBT frequency bands of the BWP, channel listening on a plurality of LBT frequency bands is performed at the same time, because a base station may not configure PUCCH resources for a terminal on the first LBT frequency band, or even if a plurality of PUCCH resources are configured, the PUCCH resources do not meet the latency requirement in terms of time. In some examples, a first relative time-frequency resource position of the first physical uplink control channel (PUCCH) for sending the uplink communication message relative to the first LBT frequency band is the same as a second relative time-frequency resource position of the second physical uplink control channel (PUCCH) relative to the second LBT frequency band, that is, the first physical uplink control channel (PUCCH) and the second physical uplink control channel (PUCCH) have different indexes on the corresponding LBT frequency bands.

Illustratively, uplink BWP configured for the terminal includes two LBT frequency bands which are respectively a LBT bandwidth 0 and a LBT bandwidth 1. The physical resource position of the terminal for sending the HARQ-ACK information configured by the base station is PUCCH channel 1 on the LBT bandwidth 0, a time-frequency resource occupied by the PUCCH channel 1 is a symbol 13/14, and a frequency domain resource location is interlacing 3. The terminal needs to carry out channel listening before sending the HARQ-ACK information on the PUCCH channel 1, and if the channel listening on the LBT bandwidth 0 fails, and the channel listening on the LBT bandwidth 1 succeeds, the terminal selects PUCCH channel 2 on the LBT bandwidth 1 to send the HARQ-ACK information. The PUCCH channel 2 is a channel on the LBT bandwidth 1, the occupied time domain resource position is the same as that of the PUCCH channel 1 on the LBT bandwidth 0, the occupied time-frequency resource is a symbol 13/14, and the occupied frequency domain resource location of the PUCCH channel 2 on the LBT bandwidth 1 is the same as the relative position of the PUCCH channel 1 on the LBT bandwidth 0, that is, interlacing 3.

In combination with the above example, it can be understood that a frequency domain resource location of the second physical uplink control channel (PUCCH) on the second LBT frequency band is translated to the first LBT frequency band to obtain the first physical uplink control channel (PUCCH).

In some examples, a channel parameter of the first physical uplink control channel (PUCCH) is consistent with a channel parameter of the second physical uplink control channel (PUCCH), and the channel parameter includes at least one of a channel format, a maximum code rate and a cyclic shift code.

The uplink communication message may be implemented as HARQ-ACK information, and in some examples, the uplink communication message is high-priority HARQ-ACK information.

In some examples, when at least two LBT frequency bands include n LBT frequency bands on which channel listening is successful, n being a positive integer, the first LBT frequency band is determined by any one of:

1. in response to the fact that the at least two LBT frequency bands include n LBT frequency bands on which channel listening is successful, the first LBT frequency band is selected according to the index number sequence of the LBT frequency bands; and in some examples, the first LBT frequency band is selected in sequence according to the index numbers of the n LBT frequency bands sorted from small to large, for example, a LBT frequency band with a smallest index number in the n LBT frequency bands is selected as the first LBT frequency band.
2. In response to the fact that the at least two LBT frequency bands include n LBT frequency bands on which channel listening is successful, the first LBT frequency band with a minimum channel interference level is selected; and
3. in response to the fact that the at least two LBT frequency bands include n LBT frequency bands on which channel listening is successful, one LBT frequency band is randomly selected as the first LBT frequency band.

In conclusion, according to the communication method provided by the examples of the disclosure, channel listening is performed on the at least two LBT frequency bands, thus the first LBT frequency band on which channel listening is successful is determined from the at least two LBT frequency bands, and the uplink communication message is sent on the first physical uplink control channel (PUCCH) of the first LBT frequency band. Thus, a high-priority HARQ-ACK message can occupy a channel with a higher probability during transmission, consequently ensuring low-latency and high-reliability transmission of PUCCH information.

Figure 3:
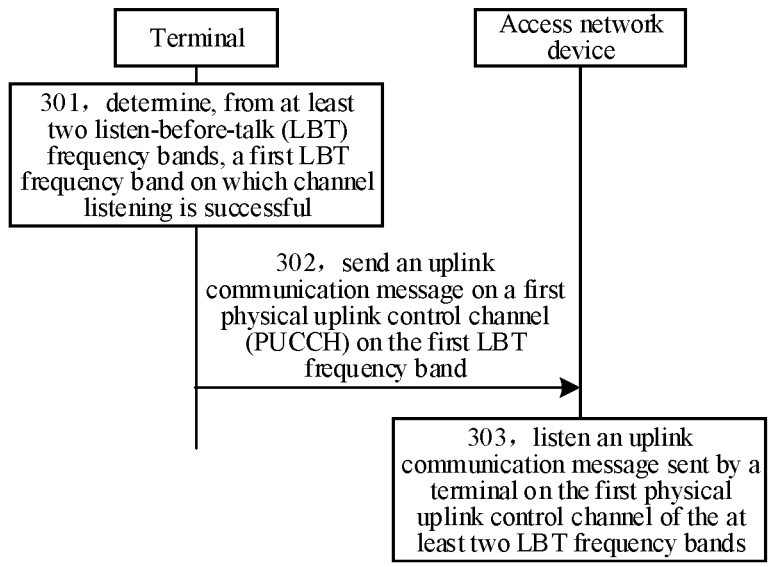
FIG. 3 is a flow chart of a communication method provided by another example of the disclosure.

In one optional example, a terminal performs channel listening on at least two LBT frequency bands, and selects a LBT frequency band on which channel listening is successful to send an uplink communication message; and a base station listens the uplink communication message on the at least two LBT frequency bands. FIG. 3 is a flow chart of a communication method provided by another example of the disclosure, the method is applied to the communication system as shown in FIG. 1 as an example, and as shown in FIG. 3, the method includes steps 301-303.

In step 301, a terminal determines, from at least two listen-before-talk (LBT) frequency bands, a first LBT frequency band on which channel listening is successful.

In some examples, the at least two LBT frequency bands include any one of: firstly, a terminal is configured with a first physical uplink control channel (PUCCH) for sending an uplink communication message, the first physical uplink control channel (PUCCH) is configured with at least two corresponding LBT frequency bands, and channel listening is performed on the at least two LBT frequency bands; and secondly, a terminal is configured with a second physical uplink control channel (PUCCH) for sending an uplink communication message, the second physical uplink control channel (PUCCH) is configured to correspond to a second LBT frequency band, and channel listening is performed on at least two LBT frequency bands including the second LBT frequency band.

Next, step 302, the terminal sends an uplink communication message on a first physical uplink control channel (PUCCH) on the first LBT frequency band.

For the two LBT frequency band determination methods, sending modes of the uplink communication message are respectively described.

Firstly, when a terminal is configured with a first physical uplink control channel (PUCCH) for sending an uplink communication message and the first physical uplink control channel (PUCCH) is configured with at least two corresponding LBT frequency bands, after the first LBT frequency band on which channel listening is successful is determined from the at least two LBT frequency bands, the uplink communication message is sent on the first physical uplink control channel (PUCCH) of the first LBT frequency band; and Secondly, a terminal is configured with a second physical uplink control channel (PUCCH) for sending an uplink communication message, the second physical uplink control channel (PUCCH) is configured with a second LBT frequency band, and if channel listening on the second LBT frequency band fails, the first LBT frequency band on which channel listening is successful is determined from other LBT frequency bands of the BWP, and channel listening on a plurality of LBT frequency bands is performed at the same time.

Then, in step 303, an access network device listens the uplink communication message sent by the terminal on the first physical uplink control channel of the at least two LBT frequency bands.

In some examples, a terminal is configured with uplink BWP, the uplink BWP includes at least two LBT frequency bands, and the access network device listens the uplink communication message on the first physical uplink control channel of the at least two LBT frequency bands.

In some examples, a mode in which the access network device listens the uplink communication message includes any one of: firstly, when the access network device configures a first physical uplink control channel (PUCCH) for sending an uplink communication message for a terminal, and the first physical uplink control channel (PUCCH) is configured with at least two corresponding LBT frequency bands, the access network device listens the uplink communication message from the first PUCCH of the at least two LBT frequency bands; and in some examples, the uplink communication message is sequentially listened from the first PUCCH channel from small to large according to the indexes of the LBT frequency bands.

Secondly, the access network device configures a second physical uplink control channel (PUCCH) for sending an uplink communication message for the terminal, and the second physical uplink control channel (PUCCH) is configured with a second LBT frequency band.

In some examples, the access network device firstly listens the second physical uplink control channel (PUCCH) of the second LBT frequency band, and when the second physical uplink control channel (PUCCH) does not include the uplink communication message sent by the terminal, listening is performed on other LBT frequency bands, and the uplink communication message is listened from a first physical uplink control channel (PUCCH) of a first LBT frequency band in the other LBT frequency bands, and the first LBT frequency band is a LBT frequency band on which channel listening is successful when the terminal sends the uplink communication message. In some examples, a first relative time-frequency resource position of the first physical uplink control channel (PUCCH) relative to the first LBT frequency band is the same as a second relative time-frequency resource position of the second physical uplink control channel (PUCCH) relative to the second LBT frequency band, that is, the first physical uplink control channel (PUCCH) and the second physical uplink control channel (PUCCH) have different indexes on the corresponding LBT frequency bands.

In combination with the above example, it can be understood that a frequency domain resource location of the second physical uplink control channel (PUCCH) on the second LBT frequency band is translated to the first LBT frequency band to obtain the first physical uplink control channel (PUCCH).

In some examples, a channel parameter of the first physical uplink control channel (PUCCH) is consistent with a channel parameter of the second physical uplink control channel (PUCCH), and the channel parameter includes at least one of a channel format, a maximum code rate and a cyclic shift code.

In some examples, the access network device sequentially listens the uplink communication message from the PUCCH channel from small to large according to the indexes of the LBT frequency bands.

In conclusion, according to the communication method provided by the examples of the disclosure, channel listening is performed on the at least two LBT frequency bands, thus the first LBT frequency band on which channel listening is successful is determined from the at least two LBT frequency bands, and the uplink communication message is sent on the first physical uplink control channel (PUCCH) of the first LBT frequency band. Thus, a high-priority HARQ-ACK message can occupy a channel with a higher probability during transmission, consequently ensuring low-latency and high-reliability transmission of PUCCH information.

Figure 4:
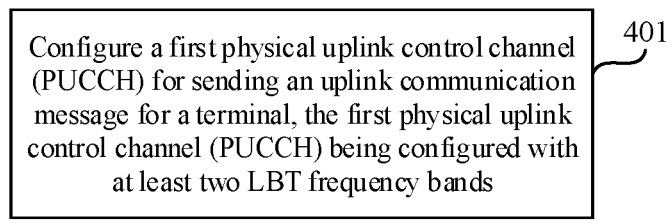
FIG. 4 is a flow chart of a resource scheduling method provided by one example of the disclosure.

The disclosure also discloses a resource scheduling method, as shown in FIG. 4, the method is applied to an access network device as an example, and the method includes step 401.

In step 401, a first physical uplink control channel (PUCCH) for sending an uplink communication message is configured for a terminal, where the first physical uplink control channel (PUCCH) is configured with at least two LBT frequency bands.

In one optional example, the method may include: for the at least two LBT frequency bands, a same channel parameter is configured for the first physical uplink control channel (PUCCH).

In one optional example, the channel parameter includes at least one of a relative time-frequency resource position, a channel format, a maximum code rate, and a cyclic shift code.

In one optional example, the method may include: for the at least two LBT frequency bands, different channel parameters are configured for the first physical uplink control channel (PUCCH).

Through the above technical solution, the resource configuration of the terminal can be improved, and flexible scheduling of system resources is realized to ensure stable and efficient PUCCH channel transmission.

Figure 5:
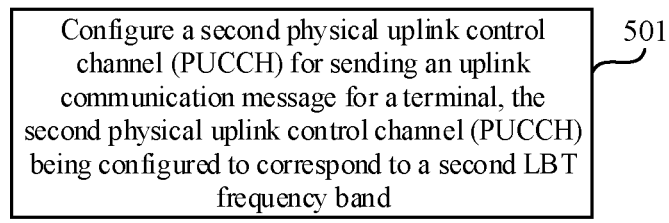
FIG. 5 is a flow chart of a resource scheduling method provided by another example of the disclosure.

The disclosure also discloses a resource scheduling method, as shown in FIG. 5, the method is applied to an access network device as an example, and the method includes step 501.

In step 501, a second physical uplink control channel (PUCCH) for sending an uplink communication message is configured for a terminal, where the second physical uplink control channel (PUCCH) is configured to correspond to a second LBT frequency band.

In one optional example, the method may include: in response to the fact that the second physical uplink control channel (PUCCH) does not include an uplink communication message, the uplink communication message is received from a first physical uplink control channel (PUCCH) of a first LBT frequency band in other LBT frequency bands.

In one optional example, a first relative time-frequency resource position of the first physical uplink control channel (PUCCH) relative to the first LBT frequency band is the same as a second relative time-frequency resource position of the second physical uplink control channel (PUCCH) relative to the second LBT frequency band.

In one optional example, a channel parameter of the first physical uplink control channel (PUCCH) is consistent with a channel parameter of the second physical uplink control channel (PUCCH), and the channel parameter includes at least one of a channel format, a maximum code rate and a cyclic shift code.

In one optional example, the at least two LBT frequency bands are LBT frequency bands included in a bandwidth part (BWP) configured for the terminal.

Similarly, through the above technical solution, the resource configuration of the terminal can be improved, and flexible scheduling of system resources is realized to ensure stable and efficient PUCCH channel transmission.

Figure 6:
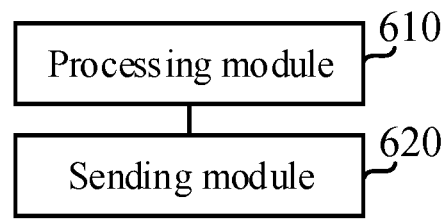
FIG. 6 is a structural block diagram of a communication apparatus provided by one example of the disclosure.

FIG. 6 is a structural block diagram of a communication apparatus provided by one example of the disclosure, as shown in FIG. 6, the apparatus is applied to a terminal as an example, and the apparatus includes a processing module 610 and a sending module 620.

The processing module 610 is configured to determine, from at least two listen-before-talk (LBT) frequency bands, a first LBT frequency band on which channel listening is successful; and The sending module 620 is configured to send an uplink communication message on a first physical uplink control channel (PUCCH) on the first LBT frequency band.

In one optional example, the terminal is configured with the first physical uplink control channel (PUCCH) for sending the uplink communication message, and the first physical uplink control channel (PUCCH) is configured with the at least two LBT frequency bands.

In an optional example, for the at least two LBT frequency bands, channel parameters of the first physical uplink control channel (PUCCH) are the same.

In one optional example, the channel parameters include at least one of relative time-frequency resource positions, channel formats, maximum code rates and cyclic shift codes in different LBT frequency bands.

In one optional example, for the at least two LBT frequency bands, parameter configurations of the first physical uplink control channel (PUCCH) are different.

In one optional example, the terminal is configured with a second physical uplink control channel (PUCCH) for sending the uplink communication message, and the second physical uplink control channel (PUCCH) is configured to correspond to a second LBT frequency band. The processing module 610 is further configured to determine the first LBT frequency band on which channel listening is successful from other LBT frequency bands in response to the failure of channel listening on the second LBT frequency band. In one optional example, the sending module 620 is further configured to send the uplink communication message on the second physical uplink control channel (PUCCH) in response to successful channel listening on the second LBT frequency band.

In one optional example, a first relative time-frequency resource position of the first physical uplink control channel (PUCCH) relative to the first LBT frequency band is the same as a second relative time-frequency resource position of the second physical uplink control channel (PUCCH) relative to the second LBT frequency band.

In one optional example, a channel parameter of the first physical uplink control channel (PUCCH) is consistent with a channel parameter of the second physical uplink control channel (PUCCH); and the channel parameter includes at least one of a channel format, a maximum code rate and a cyclic shift code.

In one optional example, the at least two LBT frequency bands are LBT frequency bands included in a bandwidth part (BWP) configured for the terminal.

In one optional example, the processing module 610 is further configured to select the first LBT frequency band according to the index number sequence of the LBT frequency bands in response to the fact that the at least two LBT frequency bands include n LBT frequency bands on which channel listening is successful, n being a positive integer.

In one optional example, the first LBT frequency band is selected in sequence according to the index numbers of the LBT frequency bands sorted from small to large.

In one optional example, the processing module 610 is further configured to select the first LBT frequency band with a minimum channel interference level in response to the fact that the at least two LBT frequency bands include n LBT frequency bands on which channel listening is successful, n being a positive integer.

Figure 7:
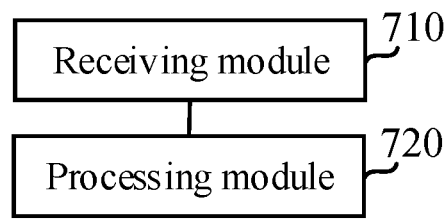
FIG. 7 is a structural block diagram of a communication apparatus provided by another example of the disclosure.

FIG. 7 is a structural block diagram of a communication apparatus provided by another example of the disclosure, the apparatus is applied to an access network device as an example, and as shown in FIG. 7, the apparatus includes a receiving module 710, configured to listen an uplink communication message sent by a terminal on a first physical uplink control channel (PUCCH) of at least two listen-before-talk (LBT) frequency bands.

In one optional example, the apparatus further includes a processing module 720, configured to configure the first physical uplink control channel (PUCCH) for sending the uplink communication message for the terminal, where the first physical uplink control channel (PUCCH) is configured with the at least two LBT frequency bands.

In one optional example, the processing module 720 is further configured to configure a same channel parameter for the first physical uplink control channel (PUCCH) for the at least two LBT frequency bands.

In one optional example, the channel parameter includes at least one of relative time-frequency resource positions, channel formats, maximum code rates and cyclic shift codes in different LBT frequency bands.

In one optional example, the processing module 720 is further configured to configure different channel parameters for the first physical uplink control channel (PUCCH) for the at least two LBT frequency bands.

In one optional example, the apparatus further includes a processing module 720, configured to configure a second physical uplink control channel (PUCCH) for sending the uplink communication message for the terminal, where the second physical uplink control channel (PUCCH) is configured to correspond to a second LBT frequency band; and the receiving module 710 is further configured to receive the uplink communication message from the first physical uplink control channel (PUCCH) of a first LBT frequency band in other LBT frequency bands in response to the fact that the second physical uplink control channel (PUCCH) does not include the uplink communication message.

In one optional example, a first relative time-frequency resource position of the first physical uplink control channel (PUCCH) relative to the first LBT frequency band is the same as a second relative time-frequency resource position of the second physical uplink control channel (PUCCH) relative to the second LBT frequency band.

In one optional example, a channel parameter of the first physical uplink control channel (PUCCH) is consistent with a channel parameter of the second physical uplink control channel (PUCCH); and the channel parameter includes at least one of a channel format, a maximum code rate and a cyclic shift code.

In one optional example, the at least two LBT frequency bands are LBT frequency bands included in a bandwidth part (BWP) configured for the terminal.

In conclusion, according to the communication apparatus provided by the examples of the disclosure, channel listening is performed on the at least two LBT frequency bands, thus the first LBT frequency band on which channel listening is successful is determined from the at least two LBT frequency bands, and the uplink communication message is sent on the first physical uplink control channel (PUCCH) of the first LBT frequency band. Thus, a high-priority HARQ-ACK message can occupy a channel with a higher probability during transmission, consequently ensuring low-latency and high-reliability transmission of PUCCH information.

Figure 8:
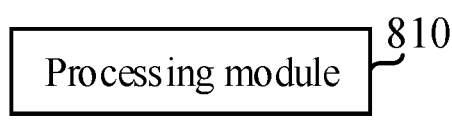
FIG. 8 is a structural block diagram of a resource scheduling device provided by one example of the disclosure.

The disclosure further discloses a resource scheduling device, and as shown in FIG. 8, the device includes a processing module 810, configured to configure a first physical uplink control channel (PUCCH) for sending an uplink communication message for a terminal, where the first physical uplink control channel (PUCCH) is configured with at least two LBT frequency bands.

In one optional example, the processing module 810 is further configured to configure a same channel parameter for the first physical uplink control channel (PUCCH) for the at least two LBT frequency bands.

In one optional example, the channel parameter includes at least one of a relative time-frequency resource position, a channel format, a maximum code rate, and a cyclic shift code.

In one optional example, the processing module 810 is further configured to configure different channel parameters for the first physical uplink control channel (PUCCH) for the at least two LBT frequency bands.

Through the above technical solution, the resource configuration of the terminal can be improved, and flexible scheduling of system resources is realized.

Figure 9:
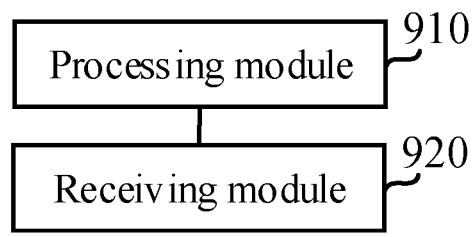
FIG. 9 is a structural block diagram of a resource scheduling device provided by another example of the disclosure.

The disclosure further discloses a resource scheduling device, and as shown in FIG. 9, the device includes a processing module 910, configured to configure a second physical uplink control channel (PUCCH) for sending an uplink communication message for a terminal, where the second physical uplink control channel (PUCCH) is configured to correspond to a second LBT frequency band.

In one optional example, the device further includes a receiving module 920, configured to receive the uplink communication message from a first physical uplink control channel (PUCCH) of a first LBT frequency band in other LBT frequency bands in response to the fact that the second physical uplink control channel (PUCCH) does not include an uplink communication message.

In one optional example, a first relative time-frequency resource position of the first physical uplink control channel (PUCCH) relative to the first LBT frequency band is the same as a second relative time-frequency resource position of the second physical uplink control channel (PUCCH) relative to the second LBT frequency band.

In one optional example, a channel parameter of the first physical uplink control channel (PUCCH) is consistent with a channel parameter of the second physical uplink control channel (PUCCH), and the channel parameter includes at least one of a channel format, a maximum code rate and a cyclic shift code.

In one optional example, the at least two LBT frequency bands are LBT frequency bands included in a bandwidth part (BWP) configured for the terminal.

Figure 10:
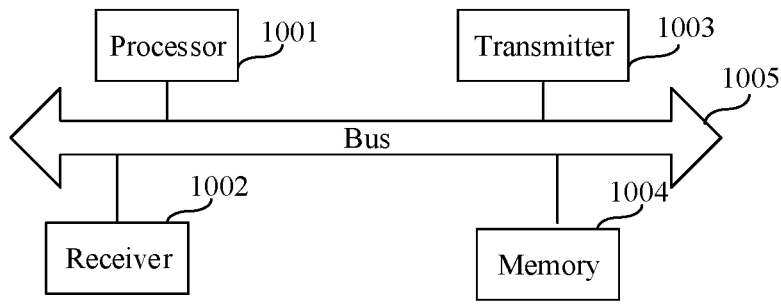
FIG. 10 is a block diagram of a terminal provided by one example of the disclosure.

FIG. 10 shows a structural schematic diagram of a terminal provided by one example of the disclosure. The terminal includes a processor 1001, a receiver 1002, a transmitter 1003, a memory 1004 and a bus 1005.

The processor 1001 includes one or more processing cores, and the processor 1001 executes various function applications and information processing by running software programs and modules.

The receiver 1002 and the transmitter 1003 can be implemented as one communication assembly, and the communication assembly can be a communication chip.

The memory 1004 is connected with the processor 1001 through the bus 1005.

The memory 1004 can be configured to store at least one instruction, and the processor 1001 is configured to execute the at least one instruction so as to implement the steps in the examples of the method.

Furthermore, the memory 1004 may be implemented by any type of volatile or non-volatile storage devices, or a combination of them, the volatile or non-volatile storage device including but not limited to: a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory and a programmable read-only memory (PROM).

In an example, a non-transitory computer readable storage medium including instructions, such as a memory including instructions, is also provided, the instructions being executable by a processor of a terminal to complete the method executed by a terminal side in the communication method. For example, the non-transitory computer readable storage medium may be ROM, a random access memory (RAM), CD-ROM, a magnetic tape, a floppy disk, an optical data storage device, or the like.

According to the non-transitory computer readable storage medium, the terminal is enabled to execute the above communication method when the instructions in the non-transitory computer readable storage medium are executed by the processor of the terminal.

Figure 11:
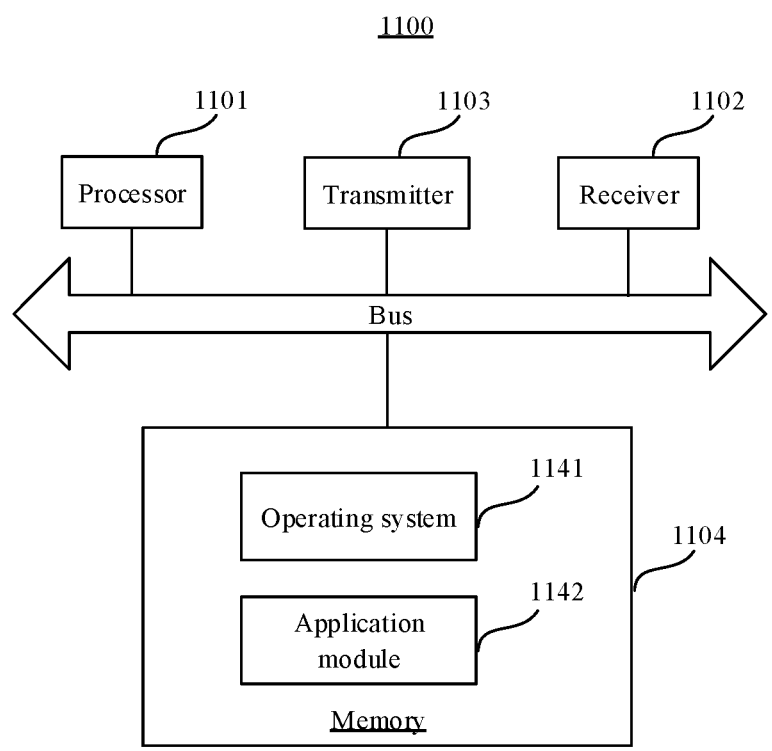
FIG. 11 is a block diagram of an access network device provided by one example of the disclosure.

FIG. 11 is a block diagram of an access network device 1100 shown according to one example. The access network device 1100 may be a base station.

The access network device 1100 may include a processor 1101, a receiver 1102, a transmitter 1103, and a memory 1104. The receiver 1102, the transmitter 1103 and the memory 1104 are respectively connected with the processor 1101 through a bus.

The processor 1101 includes one or more processing cores, and the processor 1101 executes the method executed by the access network device in the communication method provided by the examples of the disclosure by running software programs and modules. The memory 1104 may be configured to store software programs and modules. Specifically, the memory 1104 can store an operating system 1141 and an application module 1142 required for at least one function. The receiver 1102 is configured to receive communication data sent by other equipment, and the transmitter 1103 is configured to send communication data to other equipment.

One example of the disclosure further provides a communication system. The system includes a terminal and an access network device; the terminal includes the communication apparatus provided by the example shown in FIG. 6; and the access network device includes the communication apparatus provided by the example shown in FIG. 7; or the access network device includes the resource scheduling device provided by the example shown in FIG. 8; or, the access network device includes the resource scheduling device provided by the example shown in FIG. 9.

One example of the disclosure further provides a communication system. The communication system includes a terminal and an access network device; the terminal includes the terminal provided by the example shown in FIG. 10; and the access network device includes the access network device provided by the example as shown in FIG. 11.

One example of the disclosure further provides a non-transitory computer readable storage medium, where at least one instruction, at least one program, a code set or an instruction set is stored in the non-transitory computer readable storage medium. The at least one instruction, the at least one program, the code set or the instruction set is loaded and executed by the processor so as to implement the steps executed by the terminal or the access network device in the communication method provided by the examples of the method.

It should be understood that "a plurality of" mentioned herein refer to two or more. "and/or" describes an association relationship of associated objects, and represents that three relationships can exist, for example, A and/or B can represent that A exists alone, A and B exist at the same time and B exists alone. The character '/' generally represents that front and back associated objects have an 'OR' relationship.

Other implementation modes of the disclosure will be readily conceived by those skilled in the art after taking into account the description and practicing the disclosure disclosed herein. The disclosure is intended to cover any variation, use or adaptive variation of the disclosure that follows the general principles of the disclosure and includes known common knowledge or habitual technical means in the art that are not disclosed by the disclosure. The description and examples are considered examples, and the true scope and spirit of the disclosure are indicated by the following claims.

It should be understood that the disclosure is not limited to the precise structures that have been described above and shown in the drawings, and that various modifications and changes can be made without departing from the scope of the disclosure. The scope of the disclosure is limited by the appended claims.

What is claimed is:

1. A method for wireless communication, performed by a terminal, the method comprising:

determining, from at least two listen-before-talk (LBT) frequency bands, a first LBT frequency band on which channel listening is successful; and sending an uplink communication message on a first physical uplink control channel (PUCCH) on the first LBT frequency band;

determining, from other LBT frequency bands, the first LBT frequency band on which channel listening is successful, in response to a failure of channel listening on a second LBT frequency band, and sending the uplink communication message on the first PUCCH; and sending the uplink communication message on a second PUCCH, in response to successful channel listening on the second LBT frequency band, wherein the terminal is configured with the second PUCCH for sending the uplink communication message, and the second PUCCH is configured to correspond to the second LBT frequency band;

wherein a first relative time-frequency resource position of the first PUCCH relative to the first LBT frequency band is the same as a second relative time-frequency resource position of the second PUCCH relative to the second LBT frequency band.

2. The method according to claim 1, wherein
the terminal is configured with the first PUCCH for sending the uplink communication message, and the first PUCCH is configured with the at least two LBT frequency bands.

3. The method according to claim 2, wherein
for the at least two LBT frequency bands, channel parameters of the first PUCCH are the same.

4. The method according to claim 2, wherein
for the at least two LBT frequency bands, parameter configurations of the first PUCCH are different.

5. The method according to claim 1, wherein
a channel parameter of the first PUCCH is consistent with a channel parameter of the second PUCCH; wherein
the channel parameter comprises at least one of a channel format, a maximum code rate and a cyclic shift code.

6. The method according to claim 1, wherein
the at least two LBT frequency bands are LBT frequency bands contained in a bandwidth part (BWP) configured for the terminal.

7. The method according to claim 1, wherein the method further comprises:

selecting the first LBT frequency band according to the index number sequence of the LBT frequency bands, n being a positive integer, in response to the at least two LBT frequency bands comprising n LBT frequency bands on which channel listening is successful.

8. The method according to claim 7, wherein
the first LBT frequency band is selected in sequence according to the index numbers of the LBT frequency bands sorted from small to large.

9. The method according to claim 1, wherein the method further comprises:

selecting the first LBT frequency band with a minimum channel interference level, in response to the at least two LBT frequency bands comprising n LBT frequency bands on which channel listening is successful, wherein n being a positive integer.

10. A method for wireless communication, performed by an access network device, the method comprising:

listening an uplink communication message sent by a terminal on a first physical uplink control channel (PUCCH) of at least two listen-before-talk (LBT) frequency bands;

configuring a second PUCCH for sending the uplink communication message for the terminal, wherein the second PUCCH is configured to correspond to a second LBT frequency band; and receiving the uplink communication message from the first PUCCH of a first LBT frequency band in other LBT frequency bands in response to the second PUCCH does not comprising the uplink communication message;

wherein a first relative time-frequency resource position of the first PUCCH relative to the first LBT frequency band is the same as a second relative time-frequency resource position of the second PUCCH relative to the second LBT frequency band.

11. The method according to claim 10, wherein the method further comprises:

configuring the first PUCCH for sending the uplink communication message for the terminal, wherein the first PUCCH is configured with the at least two LBT frequency bands.

12. The method according to claim 10, wherein
a channel parameter of the first PUCCH is consistent with a channel parameter of the second PUCCH; wherein
the channel parameter comprises at least one of a channel format, a maximum code rate and a cyclic shift code.

13. A terminal, comprising:
a processor; and
a transceiver connected with the processor;
wherein the processor is configured to:
determine, from at least two listen-before-talk (LBT) frequency bands, a first LBT frequency band on which channel listening is successful; and
send an uplink communication message on a first physical uplink control channel (PUCCH) on the first LBT frequency band;
determine, from other LBT frequency bands, the first LBT frequency band on which channel listening is successful, in response to a failure of channel listening on a second LBT frequency band, and sending the uplink communication message on the first PUCCH; and
send the uplink communication message on a second PUCCH, in response to successful channel listening on the second LBT frequency band, wherein the terminal is configured with the second PUCCH for sending the uplink communication message, and the second PUCCH is configured to correspond to the second LBT frequency band;
wherein a first relative time-frequency resource position of the first PUCCH relative to the first LBT frequency band is the same as a second relative time-frequency resource position of the second PUCCH relative to the second LBT frequency band.

14. A communication device, comprising:
a memory that stores execute executable instructions;
a processor; and
a transceiver connected with the processor;
wherein the execute executable instructions when executed by the processor, cause the communication device to act as the access network device and perform the method according to claim 10.

15. A non-transitory computer readable storage medium, storing at least one program, the at least one program when executed by a processor of the terminal cause the terminal to perform the method according to claim 1.

16. A non-transitory computer readable storage medium, storing at least one program, the at least one program when executed by a processor of the access network device, cause the access network device to perform the method according to claim 10.

* * * * *